(12) United States Patent
Shkedi

(10) Patent No.: US 7,979,307 B2
(45) Date of Patent: Jul. 12, 2011

(54) METHOD AND STORED PROGRAM FOR ACCUMULATING DESCRIPTIVE PROFILE DATA ALONG WITH SOURCE INFORMATION FOR USE IN TARGETING THIRD-PARTY ADVERTISEMENTS

(75) Inventor: Roy Shkedi, New York, NY (US)

(73) Assignee: Almondnet, Inc., New York, NY (US)

( * ) Notice: Subject to any disclaimer, the term of this patent is extended or adjusted under 35 U.S.C. 154(b) by 357 days.

(21) Appl. No.: 12/186,918

(22) Filed: Aug. 6, 2008

(65) Prior Publication Data

US 2008/0313194 A1 Dec. 18, 2008

Related U.S. Application Data

(60) Division of application No. 11/099,861, filed on Apr. 6, 2005, now Pat. No. 7,428,493, which is a continuation of application No. 09/593,993, filed on Jun. 14, 2000, now Pat. No. 6,925,440.

(30) Foreign Application Priority Data

Dec. 13, 1999 (IL) .......................................... 133489

(51) Int. Cl.
*G06Q 30/00* (2006.01)
*G06Q 10/00* (2006.01)
*G07G 1/14* (2006.01)

(52) U.S. Cl. ........................................ 705/14.4; 705/1.1
(58) Field of Classification Search .................... 705/1.1, 705/14.4
See application file for complete search history.

(56) References Cited

U.S. PATENT DOCUMENTS 4,863,384 A 9/1989 Slade
(Continued)

FOREIGN PATENT DOCUMENTS

EP 1 024 437 A2 8/2000
(Continued)

OTHER PUBLICATIONS

"Their Time Has Come", Direct, v11, n8, p. 1+, Jun. 1999.
(Continued)

*Primary Examiner* — Jonathan Ouellete
(74) *Attorney, Agent, or Firm* — Louis J. Hoffman

(57) ABSTRACT

A descriptive-profile mercantile method, for use at a juncture in a data-communications topology having associated therewith a maintained databank of partial profiles, is disclosed. The method includes the steps of: from a user, receiving a transaction having therein a first partial profile; using the first partial profile, searching a databank having a plurality of second partial profiles, wherein is included in said databank at least one null profile so that said searching will always yield at least one proximate second partial profile to the first partial profile; and between the user and the databank, contracting: (I) for the databank to own or represent a right to a first mutually agreed portion of the first partial profile, and substantially thereafter said databank incorporating the agreed portion of the first profile into at least one second partial profile; or (II) for the user to own or represent a right to a second mutually agreed portion of at least one said proximate second partial profile, and substantially thereafter the databank transmitting to the user the second mutually agreed portion of the second profile. The present invention operates best on a brokerage representation model; and thereby provides a means for making viable the economic commerce in information attributes.

10 Claims, 3 Drawing Sheets

U.S. PATENT DOCUMENTS

Figure 1:
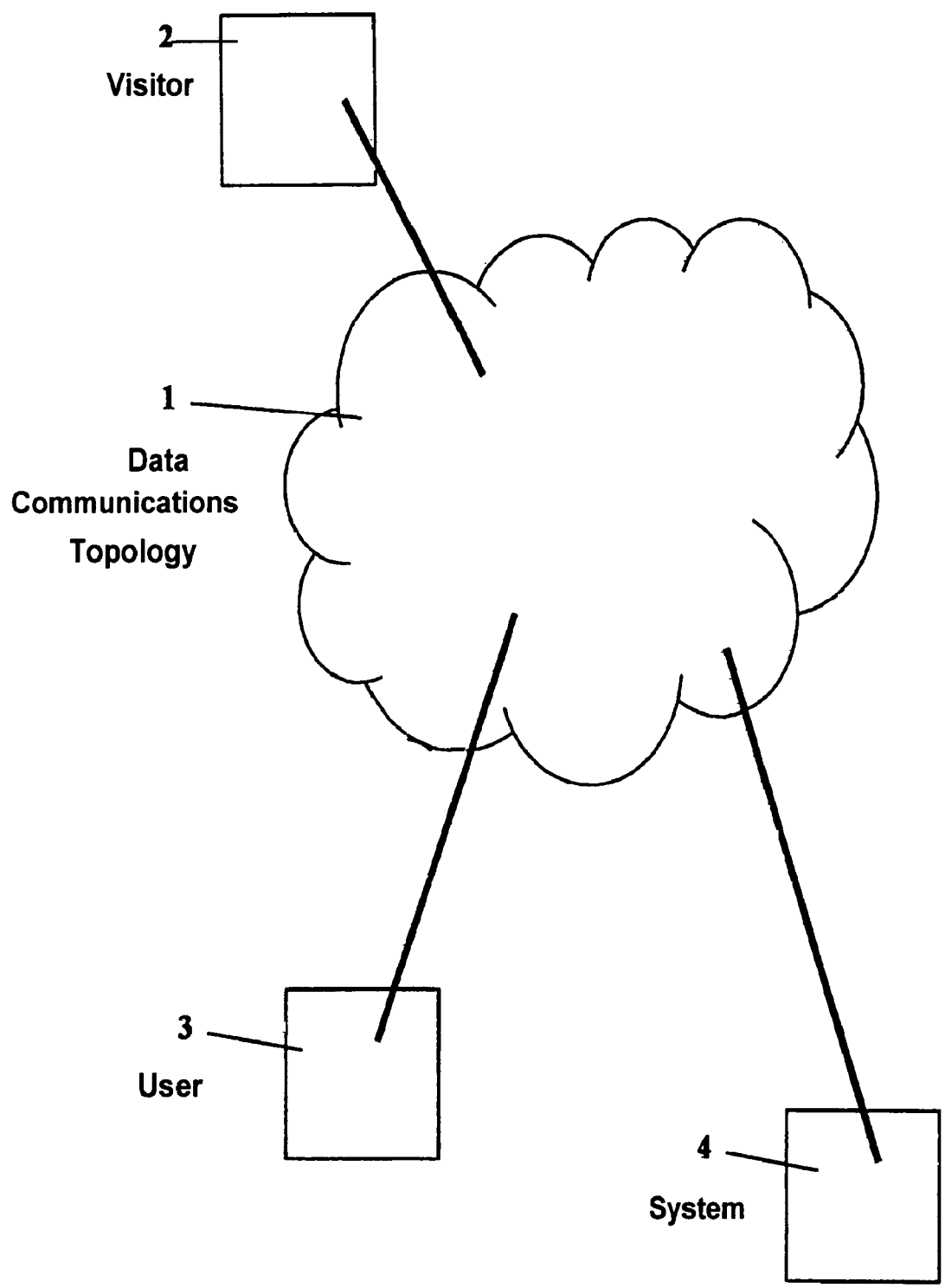

| | | | |
|---|---|---|---|
| 5,099,422 | A | 3/1992 | Foresman et al. |
| 5,446,891 | A | 8/1995 | Kaplan et al. |
| 5,710,884 | A | 1/1998 | Dedrick |
| 5,717,923 | A | 2/1998 | Dedrick |
| 5,724,521 | A | 3/1998 | Dedrick |
| 5,752,238 | A | 5/1998 | Dedrick |
| 5,848,396 | A | 12/1998 | Gerace |
| 5,855,008 | A | 12/1998 | Goldhaber et al. |
| 5,956,693 | A | 9/1999 | Geerlings |
| 6,055,513 | A | 4/2000 | Katz et al. |
| 6,055,573 | A | 4/2000 | Gardenswartz et al. |
| 6,128,624 | A | 10/2000 | Papierniak et al. |
| 6,134,532 | A | 10/2000 | Lazarus et al. |
| 6,141,010 | A | 10/2000 | Hoyle |
| 6,151,601 | A | 11/2000 | Papierniak et al. |
| 6,216,129 | B1 | 4/2001 | Eldering |
| 6,269,361 | B1 | 7/2001 | Davis et al. |
| 6,393,471 | B1 | 5/2002 | Kobata |
| 6,415,322 | B1 | 7/2002 | Jaye |
| 6,594,691 | B1 | 7/2003 | McCollum et al. |
| 6,832,207 | B1 | 12/2004 | Shkedi |
| 6,868,389 | B1 | 3/2005 | Wilkins et al. |
| 6,925,440 | B1 | 8/2005 | Shkedi |
| 6,973,436 | B1 | 12/2005 | Shkedi |
| 6,993,590 | B1 | 1/2006 | Gauthier et al. |
| 7,065,500 | B2 | 6/2006 | Singh et al. |
| 7,072,853 | B2 | 7/2006 | Shkedi |
| 2003/0149938 | A1 | 8/2003 | McElfresh et al. |

FOREIGN PATENT DOCUMENTS

| | | |
|---|---|---|
| WO | WO 97/16796 | 5/1997 |
| WO | WO 98/59481 | 12/1998 |
| WO | WO 00/08583 | 2/2000 |

OTHER PUBLICATIONS www.acxiom.com, www.archive.org, date range: Feb. 24, 1999-Nov. 14, 1999.

Barrett Jennifer, "Databasing in the 90s: data and what we're doing with it!" Direct Marketing, v58, n4, p. 40, Aug. 1995.

Odell, Patricia, "Sweetening the pot." Direct, v10, n9, p. 91, Jul. 1998.

Hatch, Denny, "Co-op databases", Target Marketing, v21n5, pp. 38-42, May 1998.

Brody, R.; "The Conditions and Consequences of Profiling in Commercial and Governmental Settings"; IEEE; 1998.

"IntelliQuest, 24/7 Media Pair to Deliver Tech Household Database"; from webpage http://www.clickz.com; Oct. 6, 1998.

"Internet Access: Intelliquest and 24/7 Media Team Up to Deliver 100 Million Household Database to Internet Marketers"; from website http://findarticles.com; Oct. 12, 1998.

24/7 Real Media Inc.—TFSM; Form S-1A, filed with the SEC Apr. 14, 1999 (portions).

Engage Technologies, Inc.; Form S-1A; filed with the SEC Jul. 19, 1999; pp. 36-50.

"The e-Marketing Report"; Morgan Stanley Dean Witter; May 2000 (portions).

"DoubleClick Launches New Marketing Solutions"; from website www.clickz.com; Oct. 6, 1998.

20 First Readable Program Code

21 Second Readable Program Code

22 Third Readable Program Code

30 Program Storage Device

42 Storage Device

41 Appurtenances

40 Computer

1 Data Communications Topology

METHOD AND STORED PROGRAM FOR ACCUMULATING DESCRIPTIVE PROFILE DATA ALONG WITH SOURCE INFORMATION FOR USE IN TARGETING THIRD-PARTY ADVERTISEMENTS

This application is a division of application Ser. No. 11/099,861, filed Apr. 6, 2005, now U.S. Pat. No. 7,428,493, which is a continuation of application Ser. No. 09/593,993, filed Jun. 14, 2000, now U.S. Pat. No. 6,925,440, which claims priority to Israel Application No. 133,489, filed Dec. 13, 1999. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a mercantile method.

More specifically, the present invention relates to a mercantile method directed to brokerage of attributes of information.

BACKGROUND OF THE INVENTION

Advances in database technology have given rise to commerce in records, files and databases, per se. For example, paying for a database credit check for an individual or buying a mailing list have become common practice. These well-known systems do not address the problems of how the database is to collect all of the attributes of information that are contained therein. Often, the contents of a database are the result of massive clerical efforts, which usually represent the product of many calendar years of transactional accumulations.

Sometimes, whole databases are merged to form higher precision data clusters. For example, voting turnout lists may be integrated with census data to produce a register from which a statistical profile of voters may be derived. Another example relates to merging the records of a credit card company with the records of a mortgage company. For those persons having an entry in each of the constituent record sets, the result is a credit profile of more precise resolution. In this example, the actual economic value of merged records exceeds the combined values of constituent records. This would likewise be true for the inclusion of any additional attribute of information to any record.

Unfortunately, the current state of information commerce is focused on the sales of whole databases, whole records, or evaluations based on single or clusters of records. In commercial applications where specific attributes of information strongly affect the value of evaluations, there is a need in the art for commerce in such attributes. For example, in targeted advertising, every attribute, which substantially affects the probability of that advertisement's success, innately has a discrete economic value. Likewise, in actuarial calculations, how precisely a client can be profiled determines what the probability of profiting from such a client.

More specifically, there remains a need in the art for assigning values to information attributes or for managing value assignments to information attributes. In the absence of such assignments or management, the commerce in information attributes, per se, is substantially precluded; especially in client-specific advertisement profiling, client-specific actuarial targeting, and the like.

The present invention will forthwith be described with a certain degree of particularity, however those versed in the art will readily appreciate that various modifications and alterations may be carried out without departing from either the spirit or scope, as hereinafter claimed.

In describing the present invention, explanations are presented in light of currently accepted theories and models; be they scientific, economic, sociological, etc. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

GLOSSARY

Profile: A collection of attributes that describe a person or an organization or any other entity that can be described by a combination of data. For example, a person profile could be a collection of the following attributes: the person's gender, the person's age, the person's education, the person's interests as reflected in his behavior or as reported by the person or as reflected from his membership in a specific club and so forth. An organization profile could be a collection of the following attributes: number of employees, activities the organization maintain whether business activities or other activities, the organization's revenues, the organization's gross profit, the organization's operating profit, the organization's net profit, the organization's equity and so forth. It should be mentioned that profile attributes include, among other things, attributes that enable the identification of the entity described by the profile such as name, address, URL, cookie. In addition, profile attributes may include information learned about the entity described by the profile from a communication protocol such as the information learned about the visitor to a web site from its http header.

User: any entity that owns attributes contained in at least one partial profile. The entity could be a web site that has a database of its visitor profiles, an organization with a database of partial profiles or the subject described by the profile itself.

Cookie: A text (or alphanumeric) string that is put on a computer hard disk of a visitor to a web site by the web site's server. The cookie enables the identification of the specific computer on its future visits to the web site. Each cookie is reported (by the computer browser) only to the web site server that installed that cookie. Therefore, it should be clearly understood that the only way for a third party to acquire cookie data is to receive that data from the server that installed that cookie, or from another third party who so acquired the data from a chain of parties going back to that cookie setting server, etc.

Contract: An agreement between a user and a system incorporating the method of the present invention wherein ownership of an attribute or a right to represent an attribute is transferred from one party to another for an agreed consideration. Generally, examples include a purchase of an attribute for cash or credit, or an acceptance of an attribute according to a brokerage fee schedule. More specifically, since there are many problems in assigning the value of an attribute, the system of the present invention may simply agree to store new attributes with the proviso that users wishing to acquire a copy of these attributes will transfer a payment specified by the original attribute provider (the royalty payment) to that provider and a brokerage fee for providing this service payable to the system's account. Alternatively, the attribute provider or the system may elect to assign a value to an attribute using a formula which factors in such parameters as newness of the attribute, geographical extent wherein the attribute is of presumable value, veracity of the attribute, etc.

SUMMARY OF THE INVENTION

The present invention generally relates to a descriptive-profile mercantile method, for use at a juncture in a data-communications topology having associated therewith a maintained databank of partial profiles, the method including the steps of:
  (a) from a user, receiving a transaction having therein a first partial profile;
  (b) using the first partial profile, searching a databank having a plurality of second partial profiles, wherein is included in said databank at least one null profile so that said searching will always yield at least one proximate second partial profile to the first partial profile;
  (c) between the user and the databank, contracting:
    i. for the databank to own or represent a right to a first mutually agreed portion of the first partial profile, and substantially thereafter said databank incorporating the agreed portion of the first profile into at least one second partial profile; or
    ii. for the user to own or represent a right to a second mutually agreed portion of at least one said proximate second partial profile, and substantially thereafter the databank transmitting to the user the second mutually agreed portion of the second profile.

The present invention comes to provide a means for making viable the economic commerce in information attributes. Since the value of such attribute will only become well understood with the implementation of the present method in the electronic commerce marketplace, the present best enabling mode for the present invention operates on a brokerage representation model. According to this model, a typical use of the present invention may be according to the following scenario.

An electronically facilitated visitor to an Internet web-site presents his credentials. These credentials could be the visitor profile itself or a cookie or a user name and so forth that enables the site to retrieve the visitor profile or any combination of the above. Of course, it could be that the site does not have a profile of the visitor to that web-site. The web-site may make better profit from the visitation if it were to know more about the visitor. The web-site forwards particulars from the visitor's credentials (a partial profile), as well as (optionally) a redirect to a portion of the visitor's page to a server located in cyberspace (at a juncture in a data communications topology). By redirecting a portion of the visitor's page to the server, the visitor's browser reports to the server a cookie the server put on the visitor's computer in the past, if any. This server interconnects the user's transactions and the server own cookie (if used) with a computer having therein software for running the method of the present invention. Associated with the computer is a databank, having therein an organized ensemble of information attributes.

The computer uses the forwarded visitor credentials with its server cookie (if any) to search the associated databank. Either or both of two possible mercantile events are set into motion thereby.

Firstly, it may be the case that the credentials contain new information attributes which were not heretofore known in the databank. According to a simple model of evaluating the value of these attributes, the database incorporates these new attributes and the computer assigns a user selected micro-payment royalty for each elected use of these attributes by any other user. Stated simply, if the user provides a date of birth for a known named person in the data bank, then the user is the owner of that date of birth attribute, and a user designated micro payment royalty (or credit) is assigned to the user for each purchase of that attribute by another user. The owner of the databank may likewise collect for itself a brokerage commission for each use of the attribute.

Secondly, the databank may contain new attributes that were not in the initial visitor credentials. In this case, the user is told that such attributes exist for purchase, what these new attributes describe (e.g. education level associated with the visitor), and the micro-payment royalty plus brokerage fee that is charged for each respective attribute. If the user is interested in any of these attributes, then a contract is agreed to, resulting in a micro-payment transfer from the user to the broker and to the royalty owner, and a transfer of a copy of the attribute to the user (the buyer).

Other types of contracts and other types of pricing structures are available for the user in his interactions with the "system of the present invention" (e.g. the computer with its associated databank); as will be describes in subsequent sections.

BRIEF DESCRIPTION OF THE FIGURES AND APPENDICES

Figure 2:
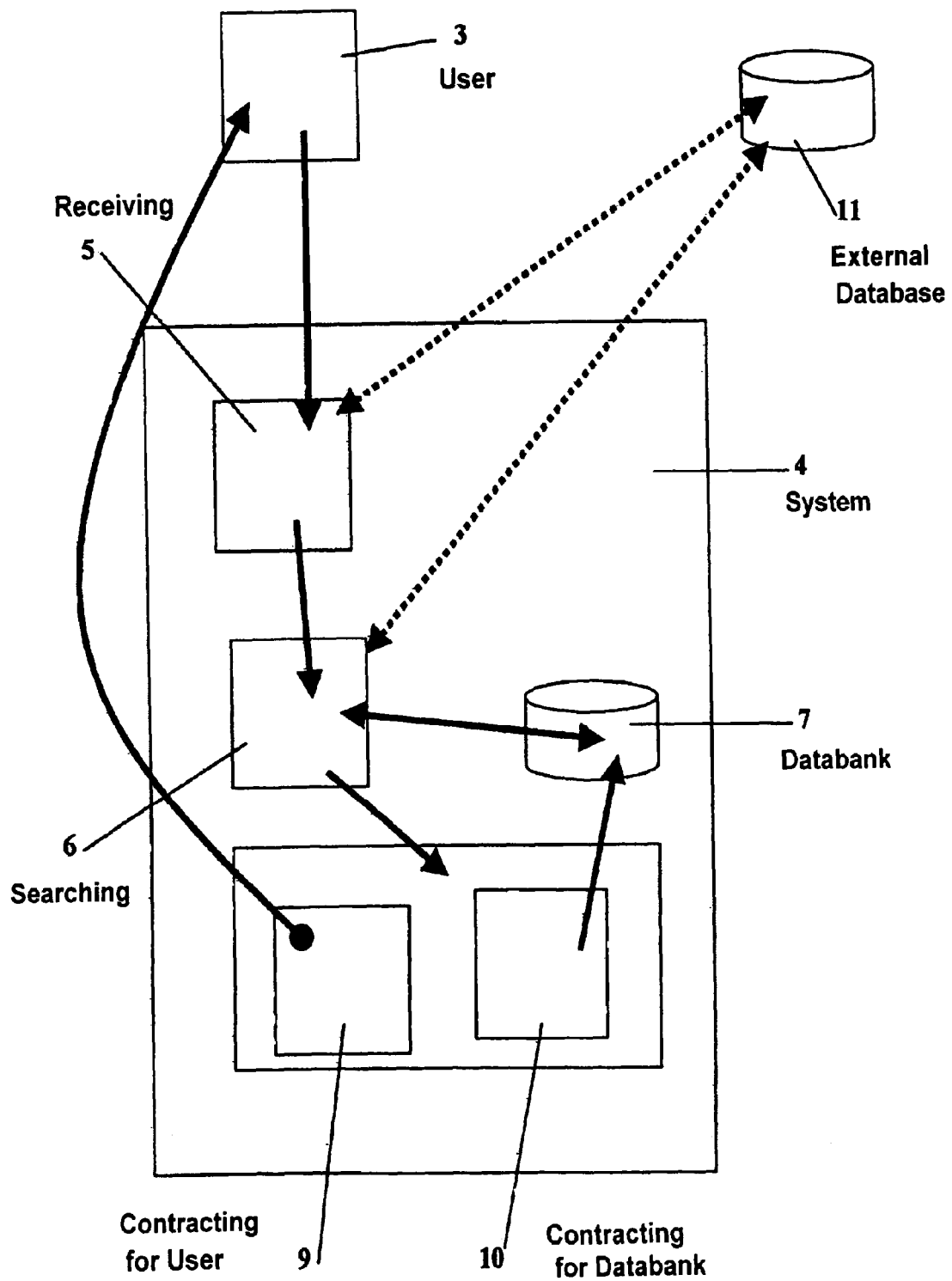
Figure 3:
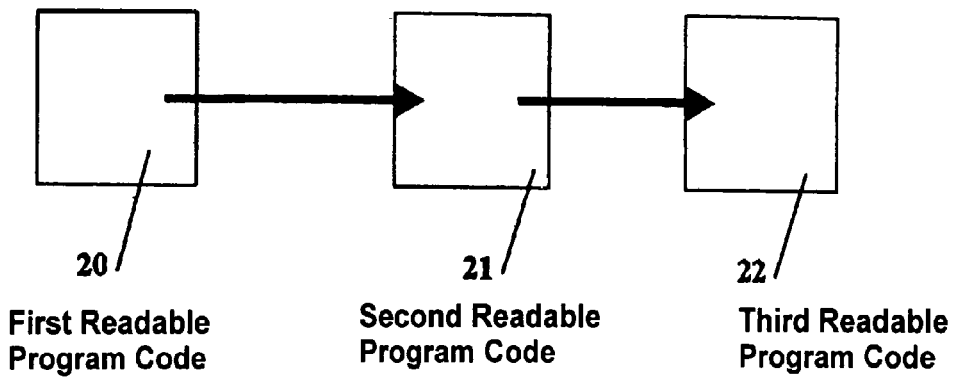
Figure 4:
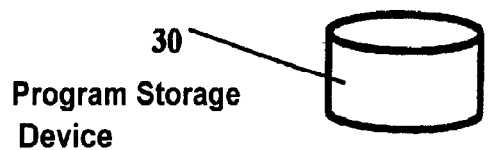
Figure 5:
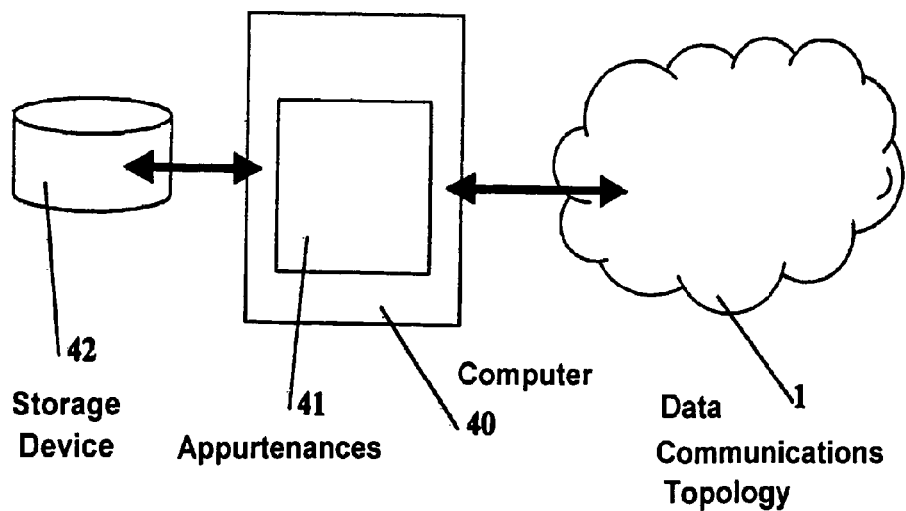

In order to understand the invention and to see how it may be carried out in practice, embodiments including the preferred embodiment will now be described, by way of non-limiting example only, with reference to the accompanying drawings, in which:
  FIG. 1 illustrates a schematic view of an Internet data-communications topology;
  FIG. 2 illustrates a schematic view of a system using the descriptive-profile mercantile method;
  FIG. 3 illustrates a schematic view of a computer program product;
  FIG. 4 illustrates a schematic view of a program storage device; and
  FIG. 5 illustrates a schematic view of an installed computer system for facilitating a descriptive-profile mercantile method.

DETAILED DESCRIPTION OF THE INVENTION

In FIG. 1 there is presented a schematic illustration of a data-communications topology as a wide area network (e.g. the Internet) (1) having interconnected thereto a visitor (2), a user (3), and a system (4) embodying the method of the present invention.

The present invention relates to a descriptive-profile mercantile method (further presented in FIG. 2), for use at a juncture in a data-communications topology having associated therewith a maintained databank of partial profiles, the method including the steps of:

(a) from a user (3), receiving (5) a transaction having therein a first partial profile;

(b) using the first partial profile, searching (6) a databank (7) having a plurality of second partial profiles, wherein is included in said databank at least one null profile so that said searching will always yield at least one proximate second partial profile to the first partial profile;

(c) between the user and the databank, contracting:

i. (10) for the databank to own or represent a right to a first mutually agreed portion of the first partial profile, and substantially thereafter said databank incorporating the agreed portion of the first profile into at least one second partial profile; or ii. (9) for the user to own or represent a right to a second mutually agreed portion of at least one said proximate second partial profile, and substantially thereafter the databank transmitting to the user the second mutually agreed portion of the second profile.

According to an embodiment of the present invention, receiving a transaction includes extracting at least one predetermined key portion of the first partial profile, wherein at least one of these extracted predetermined key portions is then used as the first partial profile for the searching of the databank. According to a variation of this embodiment, extracting includes constructing at least one composite key for the searching of the databank using a combinatorial of at least two of the predetermined key portions of the first partial profile.

According to another embodiment of the present invention, contracting includes selecting a pricing structure according to a rating of the user.

According to a different embodiment of the present invention, contracting a right includes accepting an obligation to pay for substantially each use or transfer of the agreed portion.

According to a further embodiment of the present invention, incorporating the agreed portion includes assigning a credibility weighting to the agreed portion of the first profile. According to a variation of this embodiment, incorporating includes convoluting the assigned credibility weighting of the first profile with a pre-existing credibility weighting of a substantially like agreed portion of a proximate second profile; and storing the convoluted new credibility weighting for the agreed portion in the databank. According to a further refinement of this variation, contracting includes selecting a pricing structure according to a result of a computation comparing the new credibility weighting with the pre-existing credibility weighting.

According to an additional embodiment of the present invention, receiving a transaction includes consulting an external database (11).

According to an extension embodiment of the present invention, the method furthermore includes:

i) searching at least one external database (11) for a partial profile or portion thereof which complements a at least one second partial profile of the databank, and ii) between the database and the databank, contracting for the databank to own or represent a right to a first mutually agreed portion of the complementing first partial profile, and substantially thereafter said databank incorporating the agreed portion of the first profile into at least one second partial profile.

The present invention also relates to a computer program product (see FIG. 3) including a computer usable medium having computer readable program code embodied therein for facilitating descriptive profile mercantile activities, the computer readable program code including:

a) first computer readable program code (20) for causing a computer to receive a transaction from a user, the transaction having therein a first partial profile;

b) tied to the first computer readable program code, second computer readable program code (21) for causing the computer to use the first partial profile to search a databank having a plurality of second partial profiles, wherein is included in said databank at least one null profile so that said searching will always yield at least one proximate second partial profile to the first partial profile; and c) tied to the second computer readable program code, third computer readable program code (22) for causing the computer to contract between the user and the databank:

i) for the databank to own or represent a right to a first mutually agreed portion of the first partial profile, and substantially thereafter for said databank to incorporate the agreed portion of the first profile into at least one second partial profile; or ii) for the user to own or represent a right to a second mutually agreed portion of at least one said proximate second partial profile, and substantially thereafter for the databank to transmit to the user the second mutually agreed portion of the second profile.

Furthermore, as illustrated in FIG. 4, the present invention relates to a program storage device (30) readable by machine, tangibly embodying a program of instructions executable by the machine to perform method steps for a descriptive-profile mercantile method, for use at a juncture in a data-communications topology having associated therewith a maintained databank of partial profiles, said method steps including:

a) from a user, receiving a transaction having therein a first partial profile;

b) using the first partial profile, searching a databank having a plurality of second partial profiles, wherein is included in said databank at least one null profile so that said searching will always yield at least one proximate second partial profile to the first partial profile;

c) between the user and the databank, contracting:

i) for the databank to own or represent a right to a first mutually agreed portion of the first partial profile, and substantially thereafter said databank incorporating the agreed portion of the first profile into at least one second partial profile; or ii) for the user to own or represent a right to a second mutually agreed portion of at least one said proximate second partial profile, and substantially thereafter the databank transmitting to the user the second mutually agreed portion of the second profile.

The present invention also relates to a computer system for facilitating a descriptive-profile mercantile method (see FIG. 5), the system including:

a) a computer (40) installed at a juncture in a data-communications topology (1);

b) associated with said computer, a storage device (42) for keeping a maintained databank of partial profiles; and c) associated with the internal functionality components of the computer, appurtenances (41) for performing method steps including:

i) from a user, receiving a transaction having therein a first partial profile;

ii) using the first partial profile, searching a databank having a plurality of second partial profiles, wherein is included in said databank at least one null profile so that said searching will always yield at least one proximate second partial profile to the first partial profile;

iii) between the user and the databank, contracting:
(1) for the databank to own or represent a right to a first mutually agreed portion of the first partial profile, and substantially thereafter said databank incorporating the agreed portion of the first profile into at least one second partial profile; or
(2) for the user to own or represent a right to a second mutually agreed portion of at least one said proximate second partial profile, and substantially thereafter the databank transmitting to the user the second mutually agreed portion of the second profile.

DETAILED DESCRIPTION OF THE PREFERRED EMBODIMENT

In the context of the preferred embodiment of the present invention, "attribute" relates to an information particular (or attribute) that is aggregated with other particulars to form a partial profile. Examples of attributes may be: name, address, income, age, education, details of product purchase transaction over the Internet, credit rating, etc.

In the context of the preferred embodiment of the present invention, "data" relates to knowledge concerning a visitor.

In the context of the preferred embodiment of the present invention, "data-communications topology" relates to a virtually interconnected collection of communications facilities including at least one mutually agreed protocol between any directly communication facilities in the collection.

In the context of the preferred embodiment of the present invention, "information" relates to the collection of all attributes known by a user about a visitor.

In the context of the preferred embodiment of the present invention, "pricing structure" relates to the price and payments for data exchanged by the user and the system.

In the context of the preferred embodiment of the present invention, all profiles are, by definition, partial. A profile may describe aspects of a person, or an organization, or of a corporation. It is logically impossible to have complete information about any of these. However, any particular of information about any of these may have an economic value for a customer of profile information.

In the context of the preferred embodiment of the present invention, a "databank" relates to an accessible searchable aggregation of records or like data structure units wherein "partial" profiles are stored.

In the context of the preferred embodiment of the present invention, "system" relates to a computer embodying the descriptive profile mercantile method according to the present invention.

In the context of the preferred embodiment of the present invention, "transaction" relates to a process to complete a communicative activity between the parties that reciprocally affects or influences the other party. It may include an acquisition provision of a partial profile, an identification of the user, a reference to a contractual mechanism related to the acquisition, screening, and/or distribution of new data and a pricing structure.

In the context of the preferred embodiment of the present invention, "user" relates to an individual, web site, search-robot and/or other type of software agent that interacts with the system by virtue of their contacting a juncture in the data-communications topology where the method is installed in order to acquire, trade, dispose of and/or broker some attribute data for the purpose of acquiring some potential economic or other value in connection with that attribute data.

In the context of the preferred embodiment of the present invention, "visitor" relates to an entity the user has access to or is interested in. The visitor could be a consumer or potential customer of an offering of goods, services, or information.

Introduction

This invention relates to gaining an ability to buy, sell, broker, and trade specific pieces of data between two disjoint parties within the context of a system that may include a databank and that may include a micro-payment royalty arrangement as a pricing structure in connection with the aforesaid exchange of data.

The specific pieces of data that may be involved in the exchange are known as attributes. The attributes relate to details of a particular profile. The profile can be a collection of descriptive information as used by an advertiser for generating targeted advertising or used by an insurer for finding a more specific actuarial rate. It is noted that a secondary type of profile that is also contained in another embodiment of the invention is a form of a collective profile that is an aggregate that is based on a pre-structured analysis of the existing individual profiles such as average or typical.

In the normal course of a transaction between a user and an embodiment of a system according to the present invention a typical scenario ensues:

1. A visitor arrives at a web site of the user. The web site of the user collects a variety of specific data about the visitor that may include the visitor's cookie and any other information that the visitor voluntarily disclosed to the web site.
2. The web site has a number of interests in the visitor and the information that the web site possesses about the visitor. In connection to a profile of the visitor, there would be a benefit to the web site if the web site could acquire additional information as to the specific visitor or at least acquire typical profile information about a class of individuals possessing similar profiles relative to the specific visitor. Possession of such additional information will enable the web site to engage in potentially more successful product offering and/or targeted advertising to the visitor. Another independent benefit that can accrue to the web site is the gain of some economic remuneration for and as a function of the information itself that the web site possesses about the visitor.

In order for the web site to progress and to potentially achieve either or both of the above mentioned benefits (the improved targeted advertising (or improved product offering) to the visitor as well as the gain of some economic remuneration of the information itself about the visitor); the web site now becomes a user of the system of the present invention. The web site as a user of the present invention constructs a transaction that contain those portions of the information it possesses about the visitor that it is allowed to diverge to third parties.

The transaction includes:
1. Information that the user is allowed to disclose to third parties about the visitor.
2. Contract terms about the user, typically including but not limited to: identity, predetermined rate structures per transaction type, and information type, pre-determined contractual relations with the system as to what each party—the user and the system can do with information exchanged between them.
3. Instructions as to the type of transaction—buy, sell, broker, and/or trade information to be conducted between the user and the system.

Thus, the user sends a transaction in the data communication topology where the system is installed; as for example, via the Internet, Intranet, LAN, WAN, wireless packet communications system, etc. Thereupon, the system receives the transaction, identifies the user, interprets instructions sent concerning the transaction's contractual terms and type, i.e. the applicable contract and structure for using all or some of the attributes contained in the information (hereinafter, "First Visitor Profile Data") includes the profile of the visitor as known to the site, visitor information included in the communication protocol such as the information in the http header, profile attributes that enable the identification of the entity described by the profile by the databank such as name, address, URL, cookie put by the server connected to the databank and so forth. It should be noted that the profile of the visitor known to the site mentioned above might not include certain attributes the user is not interested in exposing to the databank or attributes that are of no interest to the databank. For example, a databank that identifies web site visitors by the cookie its server puts on their computers, could decide not to take 'real world identifying attributes' such as name, address and e-mail in order to give web surfers a level of anonymity The system searches a databank according to what is contained in the First Visitor Profile Data (contained in the transaction) in order to find either: at least one profile in the databank that matches the information in the visitor profile (that includes the information dispatched by the user related to the visitor, visitor information included in the communication protocol such as the information in the http header, profile attributes that enable the identification of the entity described by the profile by the databank such as name, address, URL, cookie put by the server connected to the databank and so forth) or to find at least one aggregate profile that describes a profile of a group that the visitor might belong to.

If it is the intent of the user, as contained in the transaction instructions, to purchase additional attributes that may relate to the First Visitor Profile Data, then the system examines the profiles it has found in its search, determines if it has any new attributes not sent by the user. In the event that the system has found new attributes that were sent by the user, the system reviews the contract instructions of the transaction in order to determine the relevance of the new attributes found to the intent of the user. If the system finds the new attributes relevant, then the system will debit the user's account in accordance with a pre-agreed pricing structure in connection with additional attributes related to the First Visitor Profile Data that are delivered as data to the user.

A non-limiting example of the principle of data release in accordance with the user's contractual instructions is herein provided. It may be that in the contract with the user, the user has instructed that it is never interested in receiving any data that does not specifically relate to the visitor, meaning the user is not interested in information about an average profile of a group that the visitor might belong to. Another example could be that the user has instructed that it is not interested in the habits of a visitor, but specifically, only in information about his age, gender, education and income. The reason may be to preclude the system from disclosing the name of the visitor since the user always knows the name of the visitor and has no interest in paying to re-learn what it already knows. Thus, in accordance with the contractual instructions, no attribute data relating to information the user specified it is not interested in receiving will either be sent, and since such information was not sent, it will not be debited to the user's account.

An alternative example is the case where the user only has an interest in a pre-defined—within the transactional instructions—set of attributes. For example, the user may only be interested in what type of car the visitor drives, or what the visitor's current credit rating is, or, what may be the most interesting example, what category of goods have been purchased by the visitor over a pre-defined period. It is noted that elements of this last example may typically be a piece of information that other typical users trade with or sell to the system.

It should be noted that a user may restrict the use of attributes it sells to the databank. The restrictions could be of number of usages, to whom the databank has the permission to sell, and so forth.

A second class of data that is found by the system as it searches may equally be of value to the user. This is the search result that demonstrates discrepancies between the disclosure of information by the user to the system and the results of the search by the system. The fact that there is a discrepancy, as well as the nature of the discrepancy, may be of value to the user, the system, or both.

A third category is the example where there are pieces of information relating to the user in the descriptive portion of the transaction that describes the visitor which the search by the system failed to disclose. For example, the make and model of the car driven by the visitor, recently purchased from the user's web site might be the new information otherwise unknown to the system. In this instance, the system would go through an appropriate contractual arrangement in order to credit the user for the new attribute which the user has delivered to the system.

The various kinds of contracts available in a transaction between the system and the user are: buy, sell, broker, and trade. Where new information is disclosed to the system a royalty arrangement (or, alternatively, an outright purchase or sale) comprised of micro payments may be employed. In addition to the various kinds of contracts, there are various types of users. A user may be a large scale commercial web site or an individual small scale web page. Furthermore, there may be different types of rate structures. An audited user which may have taken efforts to verify information regarding a user, for example a credit bureau, would have a different payment rate for new information that it discloses to the system than a user with information that is neither audited nor verified but which is causal.

Thus the value of information in a databank can change as a function of its credibility and source. Accordingly, the royalty payment rate for said information could be enhanced or reduced as a function of its value.

In addition to profiles of a visitor it may be of interest to allow an embodiment of the invention to create a type of secondary market for the information consisting of a predetermined class of profiles about all visitors. For example it may be of interest to know what type of individuals, including their profession, income, gender, and geographic location, buy a certain model of vehicle. The purchase, sale, trade, and/or brokerage of this class of data can than enter a mercantile model and may be of significant interest to advertisers.

DESCRIPTION

The preferred embodiment of the present invention relates to the use of a procedure on a computer attached to a network, Internet, Intranet, LAN, WAN, wireless packet communication system or hybrid composite of any of the above whereby data is exchanged by purchase, sale, trade, or brokerage and micro payments of royalties as a pricing structure that may accompany the data exchange.

This procedure begins with the introduction to the system of data that contains a partial profile that will be used in the establishment, supplementation, or improvement of a descriptive profile. The partial profile will often itself contain certain predetermined identified commercial attributes, demographic attributes, or behavioral attributes or combinations thereof or the like. These attributes then allow construction of a descriptive profile that resides as existing information in a databank, However, inherent design characteristics of the descriptive profile result in the descriptive profile always being partial. This means that data within the profile relates to one or more attributes of the item, business, service, data characteristic, advertisement, or person that is being profiled. The descriptive profile is then methodically employed in an activity that verifies or contradicts, maintains, modifies, updates or downgrades, and/or enhances the databank of previously existing partial profiles. Thereafter, the system may retain, market, and/or exchange with the user new resultant (of the process described) data that contains further descriptive profile attributes for further usage.

Since the present invention is directed to the value of details of a profile, it is an object of the present invention to facilitate the transfer of rights to such particulars. For example, a visitor may arrive at a commercial Internet web-site. The visitor may disclose his cookie and may provide the web-site with other facts about him/herself on a non-confidential basis. The web site may then contact a juncture in a data-communications topology where the present method is installed. According to one scenario, the web-site is a familiar user of the present method, and has pre-arranged the terms and conditions of what information he may wish to transfer rights to. For example, after considering the web-site transmission containing the non-confidential disclosed information, the system may find that all of the information already recorded in its databank with the single exception of the visitor's annual income. By prearranged contract details, the web-site is given a predetermined micro-payment credit for providing this detail. Alternatively, by prearranged contract the databank agrees to store this user attribute and to credit the providing web-site with a micro-payment royalty for each use of this attribute "purchased" from the databank by each interested party.

Likewise, according to the same prearranged contractual arrangement between the user and the databank, the databank may find that it represents a right to an attribute that has not been disclosed to it by the user. In this example, the system's databank may then transmit a query to the user in the form: "for the identified visitor (detail from original transaction inserted), are you interested in the following attributes according to the associated payment conditions: (education level, micro-payment price schedule 1), (gender, micro-payment price schedule 2), etc.?"

The systematic procedure described in the preceding paragraph includes various steps that can be better illustrated by example. However, the reader should be aware that all examples which are given in this document are limiting examples that are expressed in this document solely for the purpose of explanation and not for the purpose of limitation.

Initially a user will interface with the system by providing the system's databank with a partial profile consisting of at least one attribute which will enable the identification of the entity described by the profile in the system's databank (the attribute could be for example, the cookie installed on the visitor's computer (the visitor to a web site which is a user of the system of course) by the server attached to the databank. The user enables the server attached to the databank to receive the cookie it installed by redirecting a portion of the visitor page to the databank's server). For example a company might provide the system with a name of one of its customers. This step sets the process in motion. For once there is an initiation by contribution of an initial attribute list by the user, the system will search existing data in the databank.

It should be recognized that the existing databank would have the characteristics that when it is approached by the user it will already contain or have the ability to acquire or generate a multiplicity of other partial profiles and room for at least one null profile; since it is the business of the databank to consider representing any new item of profile information. For example the databank might contain a list of geographic addresses of individuals. Then, once the user provides a name, the system will provide either a corresponding address or the message address unknown.

An alternative example has the user, in this case a web portal, providing the computer with a list of the previously monitored search habits of one of the portal's visitors. The system's databank might then suggest to the portal other web sites that contain text and/or graphics of similar type which the portal might then suggest to the visitor, presuming that the system maintains profiles on portals or web sites or surfing habits. If the web sites provided by the portal are provided on a fee basis, then a mechanism may be included in the contractual basis between the portal and the system whereby partial remuneration in the form of a micro payment would be made for any click through activity on the part of the visitor to a web site suggested by the system to the portal and then suggested by the portal to the visitor. It is noted that the click itself would be of further interest to both the portal and the system in the building by the system of a profile related to the behavioral characteristics or psychological makeup or predisposition of the visitor.

Once there is a coupling of the first partial profile of the user with a second partial profile existing in the databank, a contract can be formed between the user and the system related to the new information set which has resulted. The contract should provide that the system will own or acquire a license to utilize an agreed portion of the first partial profile which has been confirmed and at some time thereafter the system will incorporate the agreed portion of the first profile into at least one second partial profile in the system's databank.

For example the name of an individual (an initial partial profile provided by the user) when coupled with age (a second partial profile provided by another use, inherent in the system's databank, or acquired by the system searching other databases will provide a partial second profile of certain demographic value consisting of name and age. If, for example, other partial profiles are found to correspond to gender, geographic address, and/or general income, there is a further enhancement of the partial second profile which results in a gain in the value of the information residing or incorporated from other databases into the system's databank and offered for exchange in accordance with the terms and instructions existing between the user and the system.

Alternatively, rather than the system acquiring by ownership or license an agreed portion of the first profile; the user itself might desire to acquire a right to own or license to use at least a part of an agreed portion of the second partial profile which has been confirmed by the system by its coupling with the first partial profile. Thus it would be an agreed function of the system to provide to the user an agreed portion of the second profile For example the user might have the name and car model owned by a driver; the system's databank might have or have acquired the driving record of the driver and the safety record of the particular car model. The result of the coupling is the ability to refine an appropriate insurance rate for the particular driver and his car.

Alternatively the descriptive profile mercantile method might do both of the above by providing ownership or license to use certain information gleaned by the coupling of an initial partial profile with a second partial profile to both the system and the user. For example the system's databank might retain the use of the names and addresses and actuarial calculations of insurance agents residing in a geographical area proximate to the driver mentioned in the above paragraph, while a user (in this case the driver himself) might retain the name and address of the insurance agents willing to offer him insurance.

Inherent in the above examples is that the system that receives an input or exchange of data consisting of a first partial profile from a user will distill from that information at least one predetermined attribute. This attribute is then utilized by the system for searching the system's databank. Thus, the system, when receiving data, will, within the parameters of the transaction, extract at least one predetermined key portion of the first partial profile, wherein at least one of these extracted predetermined key portions is then used as the first partial profile for the searching of the system's databank. When the system extracts data it also constructs at least one composite key for the searching of the databank using a combinatorial of at least two of the predetermined key portions of the first partial profile. For example, a combination of the name and address of a person described in a profile will be used to search the databank. The combinatorial use is of importance to differentiate between partial profiles of people with the same name that do not allow cookies, for example. Continuing the example, in addition to whether the advertisement is for automobiles, it may be important to couple that information with advertisements only for home utility vans such that the first partial profile will now consist of car advertisements only for home utility vans.

An "interest" expressed by a user and the system, as to what these parties define between them as relevant data, may be expressed by the user and the system in a pricing structure. The pricing structure will include a contract between the user and the system that will include an obligation by the party which utilizes the information flowing to the system's databank to pay the other for substantially each use or transfer of the agreed information transferred between them. Instant data may or may not be ephemeral, and the profiles themselves may have either a limited or an unlimited shelf live. This means that confirmation becomes currency and is treated by the parties in a manner similar to currency. To own or utilize certain information, there is a price associated with it either as a sales price or a rental price. In the event that the information is re-useable, in part or in whole then a certain predetermined royalty may be associated with each use of the portion of the information which is reused. Let an example be provided at this juncture to further illustrate the operation of the preferred embodiment.

Normative market research consists of an array of information that is gleaned from answers provided to a questioner. However, the market research contains within itself not only the ability to provide truthful responses but also the ability to provide sampling errors due to either wrong answers, wrongly recorded answers, an error in the framing of the questions themselves, and/or an error in the population base which is being questioned. Clearly the larger and more diverse (or more homogeneous) the sample population (depending on the type of responses required), the larger number of similar questions answered, and the ability to better refine the questions all assist in increasing the value of the market analysis performed.

In the embodiment of the invention described, the user provides either a question or an answer, i.e. the initial partial profile. Thereupon, the system thereupon takes the initial partial profile and extracts from it a predetermined data that is then used for searching the databank. Depending on the contract between the user and the system, the system will or will not pay the user for the initial partial profile, or parts thereof. The search of the databank, results in the construction of a new profile that contains at least two predetermined parts of the first partial profile. For example, both the user and the system may be interested in screening the responses to a market survey of an individual respondent in order to ascertain whether on previous or similar questionnaires the respondent's answers were identical or deviant. This will allow both the user and the system to value the truthfulness of the current responses. The aforesaid quality value will have a predetermined monetary or other agreed "barter" value between the parties.

In addition, since the upgrading or downgrading of the credibility of the respondent has qualitative value in and of itself for other market surveys; to the extent that the user's information contributed to the new evaluation of the respondent, a payment might flow to the user. Similarly, to the extent that the upgrading or downgrading of the credibility of the respondent is based on existing information in the system's databank, the system may provide a royalty payment to the initiator of the existing information in the system's databank. Thus, to the extent that the information inherent in the initial partial profile and in existing partial profiles have value and to the extent that participants who utilize the system (including the system's databank itself) have agreed on the value rating of the information and the amount to be paid between them an exchange of predetermined economic value will flow between the participants. In addition, to the extent there is further information and further participants, the continuing re-evaluation by the participants of a market valuation of the information as a function of the expected utility value of the information may further drive over time the price evaluation of both the information and the payments to be made between users and the system.

Furthermore, the preferred embodiment may embrace a further possible variations, i.e. an assignment by the contracting participants and/or the databank, per se, of a credibility rating to the agreed portion of the first partial profile. Coupling of the first partial profile with a second partial profile result in verification/confirmation of the first partial profile and second partial profile or contradiction/down grading of the credibility of the first partial profile and/or the second partial profile. By example, the first partial profile contains the name of Joe Blue, the information that he is male, and the information that he lives in Mississippi. However, the corresponding second partial profile associated with Joe Blue contains the information that he is a she (real name Josephine) and that she lives in Mississippi. The verification—perhaps—of the name is of dubious value in and of itself. However, in the event that for a certainty it can be established that Joe Blue is really Josephine Blue and that the gender is female rather than male, then, to a user of the information, the validation or disqualification of the information has significant value. Assume that the user of the information is an advertiser of beauty care products. The fact that Joe is male or female can result in an advertisement of beauty care products specifically targeted to the profile—in this case, male or female. In this instant case, the user (the advertiser) will assign a value to the credibility of the information.

Intrinsic to the example immediately above is the ability of the participants either individually or collectively to either raise or lower the rated utility value assigned to the first partial profile consistent with the pre-determined (but perhaps equally dynamic) credibility weighting system of the second partial profile. Thereafter the newly rated utility value of the partial profile incorporated in the database is stored for future usage. Lets see how this works in the case of Joe (Josephine) Blue. The first partial profile indicated that Joe was male; however all subsequent partial profiles which could be assigned to Joe (Josephine) Blue render to a statistical certainty that Joe (Josephine) Blue is actually female. This, combined with other attributes like geographical address, income level, and even spending patterns, when stored in the databank, results in an increasingly higher utility value rating for the (credible) information associated with Joe (Josephine) Blue. Thus, the raising or lowering of the credibility rating of an attribute due to the interaction between the associated attribute of the first partial profile and the second partial profile results in a corresponding change in the rating of the anticipated utility value of the attributes and profile themselves.

A further variation of the preferred embodiment incorporates an agreed portion of the data and assigns a credibility rating to the agreed portion of the first profile. This is accomplished by assigning a credibility rating of the first profile with a pre-existing credibility rating of a substantially like agreed portion of a proximate second profile; and storing the convoluted new credibility weighting for the agreed portion in the system's databank. This may result in an interesting result. When the participants select a pricing structure in accordance with a predetermined corresponding rating of the utility value of the partial attributes, the result is the continuous re-calibration of new information with existing information and a predetermined agreement by the parties as to the various value rating of an attribute.

If, for example, Ms. Blue's credit rating were confirmed as bankrupt, the desire of an advertiser to send her advertisements for the purchase of a pleasure craft would be seriously impacted notwithstanding the fact that other information in the databank related to Ms Blue indicates that she is a water skiing enthusiast and otherwise fits both demographic, behavioral, and/or psychological profiles (which might reside in the databank) associated with candidates for potential purchasers of pleasure craft.

Another particularly useftl variation of the preferred embodiment of the invention includes within it the possibility of consultation by the system with an external database or external databases. For example, the system is not restricted to searching the existing attributes residing within its own databank. Rather, the system is capable of acting as a first partial profile user to other databases, searching them, trading information with them or borrowing, renting, or purchasing other attributes with them. Thus the information related to credit worthiness attributes of Ms. Blue of the previous example might reside in a database owned by a credit company. Nonetheless, as per the example, the system would be able to utilize the information resident in the credit company's database for its own purposes related to the transaction with the user.

Furthermore the preferred embodiment may embrace other possible variations, including an ability to search one or more external databases for a partial profile, or part thereof, which complements at least one second partial profile of the system's databank. In the example of Ms. Blue, the name may be resident in the databank as well as a number of different external databases. Other attributes may reside as well either in the databank or in one or more external databases. Nonetheless, the result by search, correlation, and rating of the information in the databank and the databases results in both an expanded profile and a higher rating as to credibility of the partial profile existing both in the databank and in the other databases.

Thus, both system and owners of other databases may themselves contract between themselves for the right to own, use, license, or rent the other's partial profile and for the right to sublicense others to further use the other's partial profile. Since the information may very well have a shelf life—even as its credibility and rating may change over time—the result is a corresponding velocity of the value of the information in that not only is the more the information used is the more valuable it is and becomes; but the more the information can be used the greater the potential value it has to its owners of licensors (with a right to sublicense). If we return to our example of Ms. Blue, the fact that she is female (information from the system's databank), is interested in water skiing (a partial attribute contributed by the first partial profile user), and has a restored credit rating (provided by an external credit service database) means that another user looking at its own profiles of young, single, sports minded women, would desire to provide her with advertisements related to scuba diving in the Gulf of Mexico, for example. This other user would pay the system for the information it has stored or accessed. The system itself would pay the initial provider of the verification of the gender of Ms. Blue, to the user who contributed that Ms. Blue is interested in water skiing and might share a fee associated with the clarification of Ms. Blues' actual credit worthiness.

As an alternative embodiment to a process that has previously been described is the ability to embody the invention not as a process but as a computer useable program, i.e. a software product, which allows the exchange of descriptive profiles between users, databanks, and/or computers. Another alternative is usage as a computer program storage device.

I claim:

1. An automated method of collecting profiles of Internet-using entities, the method comprising:
   (a) electronically receiving at a programmed computer system coupled to a global computer network, from at least one server controlled by one of a plurality of unaffiliated third parties operating respective websites, a partial profile of an entity that uses a user computer coupled to the global computer network and accessing the website, which partial profile contains at least one profile attribute related to the entity, and automatically with the computer system storing the received partial profile;
   (b) wherein receiving the partial profile is achieved by automatic electronic URL redirection from a portion of a page of the website accessed by the user computer;
   (c) automatically with the computer system electronically adding the received partial profile to a maintained profile believed to be related to the same entity;
   (d) automatically with the computer system generating and storing an electronic record of which of the plurality of unaffiliated third parties contributed to the maintained profile particular profile attributes;
   (e) wherein the maintained profile, including the added partial profile, comprises data used in targeting third-party advertisements to the user computer over the global computer network.

2. The method of claim 1 further comprising automatically with the computer system electronically maintaining an electronic record of which unaffiliated third party contributed, to the maintained profile, the profile attributes used in targeting the advertisements.

3. The method of claim 2 further comprising automatically with the computer system electronically determining whether the received partial profile contains any profile attributes about the entity that were not previously contained in a maintained profile.

4. The method of claim 1 further maintaining with the computer system a credibility rating associated with at least one of the profile attributes of the maintained profile.

5. The method of claim 4 wherein the credibility rating is reflected in a price for the at least one profile attribute.

6. The method of claim 1 further comprises automatically with the computer system selecting profile attributes from the maintained profile based on the source thereof.

7. The method of claim 1 further comprising automatically with the computer system electronically reading a cookie previously stored on the entity's computer, as a result of the URL redirection.

8. The method of claim 1 further comprising, in accordance with a predetermined arrangement, automatically using the electronic record of which of the plurality of unaffiliated third parties contributed to the maintained profile particular profile attributes to create electronic data used to identify a payment amount due to the unaffiliated third party as a result of using at least one of the profile attributes in the partial profile contributed by that third party in targeting the third-party advertisements to the entity's computer over the global computer network.

9. A tangible, non-transitory data storage medium comprising indicia of instructions for a processor to perform a method of updating profiles of Internet-using entities, the method comprising:

(a) electronically receiving at a programmed computer system coupled to a global computer network, from at least one server controlled by one of a plurality of unaffiliated third parties operating respective websites, a partial profile of an entity that uses a user computer coupled to the global computer network and accessing the website, which partial profile contains at least one profile attribute related to the entity, and automatically with the computer system storing the received partial profile;

(b) wherein receiving the partial profile is achieved by automatic electronic URL redirection from a portion of a page of the website accessed by the user computer;

(c) automatically with the computer system electronically adding the received partial profile to a maintained profile believed to be related to the same entity;

(d) automatically with the computer system generating and storing an electronic record of which of the plurality of unaffiliated third parties contributed to the maintained profile particular profile attributes;

(e) wherein the maintained profile, including the added partial profile, comprises data used in targeting third-party advertisements to the user computer over the global computer network.

10. The data storage medium of claim 9 wherein the indicia of instructions instruct the processor to performing a method that further comprises: in accordance with a predetermined arrangement, automatically using the electronic record of which of the plurality of unaffiliated third parties contributed to the maintained profile particular profile attributes to create electronic data used to identify a payment amount due to the unaffiliated third party as a result of using at least one of the profile attributes in the partial profile contributed by that third party in targeting the third-party advertisements to the entity's computer over the global computer network.

* * * * *